March 14, 1967    S. B. WILLIAM ET AL    3,308,665
FLUID DEPTH INDICATOR

Original Filed June 26, 1963    4 Sheets-Sheet 2

INVENTORS
SIDNEY B. WILLIAMS
VERNON C. WESTCOTT
BY
*Blair & Buckles*
ATTORNEYS

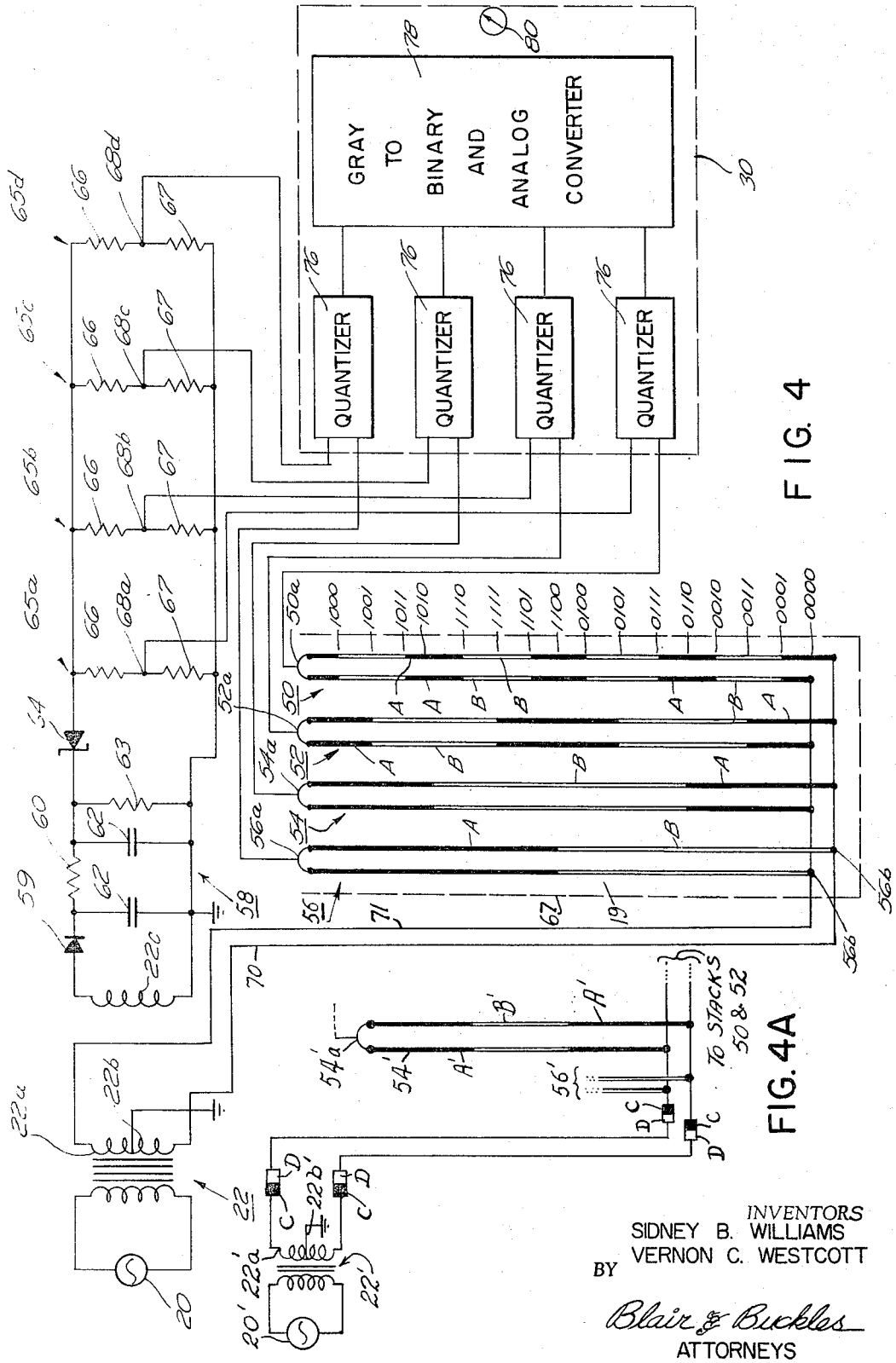

March 14, 1967 S. B. WILLIAM ET AL 3,308,665
FLUID DEPTH INDICATOR

Original Filed June 26, 1963 4 Sheets-Sheet 4

INVENTORS
SIDNEY B. WILLIAMS
VERNON C. WESTCOTT
BY

*Blair & Buckles*
ATTORNEYS

United States Patent Office 3,308,665
Patented Mar. 14, 1967

3,308,665
FLUID DEPTH INDICATOR
Sidney B. Williams, Lexington, and Vernon C. Westcott, Lincoln, Mass., assignors to Trans-Sonics, Inc., Lexington, Mass.
Continuation of application Ser. No. 290,757, June 26, 1963. This application Feb. 18, 1966, Ser. No. 539,241
33 Claims. (Cl. 73—295)

This application is a continuation of the copending, now abandoned, application Serial No. 290,757, filed June 26, 1963.

This invention relates to novel thermoelectric apparatus for locating the interface between a liquid and another fluid. More specifically, heated thermoelectric junctions disposed above and below the interface locate the interface by sensing a temperature differential resulting from the difference in the heat conduction from the junctions above and below the interface. The thermoelectric junctions are preferably logically arranged as a function of liquid depth and connected in stacks so that each stack develops one digit of a digital signal indicating the position of the interface.

A common liquid-level locating system constructed according to prior techniques utilizes a float riding on the surface of the liquid and coupled to an indicating scale. This mechanical system is bulky, and its moving parts readily become jammed, often by debris in the liquid. Moreover, the inertia of the float and its mechanical coupling renders the system unsatisfactory for many mobile applications.

A principal object of this invention is to provide improved apparatus for locating the interface between two fluids.

Another object is to provide improved apparatus for locating the level of an electrically conducting or nonconducting liquid.

Still another object of the invention is to provide apparatus of the above character that produces a digital signal indicating the height of the fluid interface.

A further object of the invention is to provide liquid-level locating apparatus that requires minimum maintenance and has a high degree of reliability, and is therefore suitable for inaccessible locations.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings, in which:

FIGS. 4 and 4A are schematic diagrams, partly in block form of a drift-stabilized system which provides a multiple digit representation of a liquid level.

Figure 1:
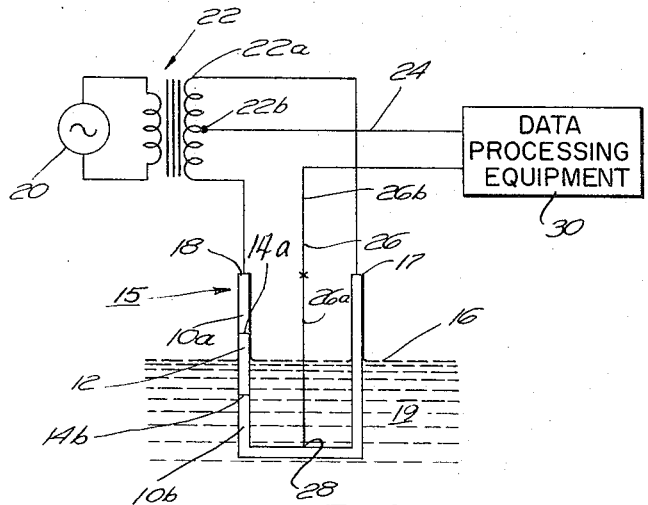
FIG. 1 is a simplified schematic representation of a liquid-level measuring system embodying the present invention.

Briefly, the invention makes use of thermally sensitive transducers or sensors which develop electric signals that vary according to the temperatures of the sensors. Preferably, the sensors are heated above the temperature of the liquid whose level is to be monitored. The sensors immersed in the liquid are cooled to a materially lower temperature than those above the surface of the liquid. Thus the signal from an immersed sensor is readily distinguished from the output of an unimmersed one.

A number of the sensors may be connected in a balancing circuit, which, in one arrangement, cancels their respective output signals against each other in the absence of any immersion in the liquid. If one of the sensors should be immersed, there will be an unbalance in the circuit and a net output signal will be developed. If a second sensor above the first one is also immersed, there will again be a cancellation of signals. As described below, this alternate balancing and unbalancing of the circuit can be used in a logical arrangement to sense the presence of the liquid at a plurality of levels.

More specifically, the preferred embodiment of the invention utilizes the Seebeck effect, whereby a thermoelectric potential is developed at the junction of a pair of dissimilar metals. As is well known, the magnitude of the potential is a function of the two metals and of the temperature of the junction.

In an elementary embodiment of the present invention, two such junctions are connected in series so that their thermoelectric potentials oppose each other, i.e., have opposite polarity. When one junction is below the liquid level and the other junction is above it, the junctions are at different temperatures and hence develop potentials of different magnitudes as well as of opposite polarity. The two-junction thermoelectric circuit then develops a net voltage that is readily sensed by suitable equipment.

On the other hand, when both junctions are immersed in the liquid or, similarly, when the liquid level is below both junctions, they are at the same temperature and develop equal thermoelectric potentials of opposite polarity. These equal and opposite potentials cancel, so that substantially no net voltage develops.

In many installations, the temperature of the liquid and of the atmosphere above it are very nearly the same. Nevertheless, the liquid level can reliably be located by heating both thermoelectric junctions. Since the liquid removes heat from an immersed junction substantially more rapidly than the atmosphere above the liquid removes heat from a non-immersed junction, i.e., the liquid has a greater thermal diffusivity than the atmosphere, the temperaure of an immersed junction is substantially lower than the temperature of a non-immersed junction. Accordingly, between immersed and non-immersed junctions there is a substantial voltage that can readily be detected.

To locate a liquid level in a container having substantial depth, a plurality of thermoelectric junctions are connected in separate stacks. The junctions in each stack are connected in series, with pairs of adjacent junctions producing opposing and substantially equal thermoelectric potentials when at the same temperature.

The junctions in the respective stacks are located according to a digital code, as detailed below, so that the voltage from each stack corresponds to one digit of a digital signal locating the liquid level. Thus, if there is an even number of junctions in a stack, the net voltage developed in the stack is zero when the liquid level is below the bottom junction, since for each junction there is another one producing an equal and opposite voltage. If the liquid rises to cover the bottom junction, that junction and the other one in the same pair will have non-cancelling potentials, while all the other pairs in the stack will still develop cancelling potentials. Thus, the net voltage developed by the entire stack will be the same as in the case where one of only two junctions is immersed.

A further rise in liquid level above the second junction in the stack will equalize the temperatures of the bottom pair of junctions, and thus the potential of the bottom junction will once again be cancelled. As a result, the net voltage developed by the stack will revert to zero. A rise of the liquid level above the next junction will then reintroduce the net voltage developed by a pair of non-cancelling junctions. Thus, the voltage from each stack alternates between two values as the liquid level rises or descends past successive junctions.

In practice, the output voltage of a stack of junctions may be made to change rather discretely as the level changes. In any case, if the system is arranged so that the voltage undergoes a continuous change back and forth between two levels, it can readily be quantized.

The thermoelectric junctions, which are logically ordered in the stacks as a function of liquid depth, are preferably arranged according to a binary system, such as the Gray or reflected binary code, in which only a single digit changes in going from each value to the next higher or lower value. Accordingly, as the liquid level rises and additional junctions are immersed, successive junctions covered by the liuqid are in different stacks. The output voltage from each stack then never varies twice before there is a change in the output from at least one other stack.

Whereas successive values in the Gray code differ in only one digit, this is generally not the case in the conventional binary system. For example, in going from the decimal number 7 to 8, 0111 to 1000, respectively, in conventional binary rotation, all four digits change. In the Gray code, however, these numbers are 0100 and 1100, respectively, with the only difference being in a single digit. This change between levels 7 and 8 corresponds to liquid levels just below and above a single junction.

Thus, with the Gray code, a small ambiguity in liquid level results in an error no greater than the ultimate resolution of the system, i.e., in the least significant digit. With conventional binary coding, the error would generally be much greater. Moreover, the Gray system provides this advantage with a materially smaller number of junctions than a conventional binary, or other logical arrangement, having the same resolution.

The digital signals from the stacks of junctions may be decoded according to conventional techniques to provide an analog signal indicating the position of the liquid level, or a standard binary signal for use with digital data processing equipment.

More specifically, in the embodiment of FIG. 1, conductors $10a$ and $10b$, of the same material, and conductor $12$ of material different from that of the conductors $10a$ and $10b$, are connected together in an alternate succession to form thermoelectric junctions $14a$ and $14b$, arranged in a stack indicated generally at $15$. The junctions, each developing substantially equal-magnitude thermoelectric potentials when at the same temperature, are vertically spaced apart and connected in series. The thermoelectric potentials of the junctions are of opposite polarity. Thus, when at the same temperature, the two junctions develop different electrical potentials in that they have opposite polarity, even though the potentials have substantially the same magnitude.

The junctions $14a$ and $14b$ are exposed to an electrically non-conducting liquid $19$ whose surface is indicated at $16$. The conductor $10b$ may be formed in a J-shape or the like to bring its end $17$ remote from the junction $14b$ above the level $16$, as is the top end $18$ of the conductor $10a$.

When the temperature of the liquid below its level $16$ is less than the temperature of the atmosphere above the level $16$, the junction $14a$ develops a greater thermoelectric potential than the immersed junction $14b$. Since the junction polarities are in series opposition, the net thermoelectric voltage developed between the ends $17$ and $18$ of the stack $15$ is the difference between the junction potentials.

With further reference to FIG. 1, when the surface level rises to immerse the junction $14a$, so that both junctions $14a$ and $14b$ are at the same temperature, they develop substantially equal and opposite thermoelectric potentials. These potentials substantially cancel, and no voltage is observed between the stack ends $17$ and $18$. Similarly, should the level $16$ fall below the junction $14b$, both junctions will again be at the same temperature, and their thermoelectric potentials will cancel. Accordingly, the voltage between the stack ends indicates whether the liquid level $16$ is above the junction $14a$ or below the junction $14b$ on the one hand, or between the junctions, on the other hand.

Where the temperature difference between the liquid $19$ and the fluid above it are slight, a substantial net thermoelectric voltage can be developed by heating the junctions to temperatures higher than the temperature of the liquid and of the fluid above it. Heating may be accomplished by passing through the stack $15$ an electric current from a source $20$. A transformer $22$, whose secondary winding $22a$ has a center tap $22b$, provides isolation between the heating current and the output voltage of the stack $15$ in a manner to be described.

With the junctions thus heated, the liquid $19$ removes heat from immersed junction $14b$ more rapidly than the atmosphere above the level $16$ removes heat from junction $14a$. Thus, the temperature of the junction $14a$ is substantially higher than that of the junction $14b$, and, as described above, a substantial net thermoelectric voltage appears between the stack ends $17$ and $18$ when the liquid level is between the junctions.

In the construction of the thermoelectric stack $15$, the conductors $10$ and $12$ preferably have substantially different thermoelectric coefficients. It is also desirable that they have equivalent thermal conductances, diameters and electrical resistances per unit length. However, these characteristics are not essential to the operation of the invention.

As shown in FIG. 1, the net thermoelectric voltage developed by the stack $15$ may be separated from the heater voltage by tapping the thermoelectric stack voltage between two points in the series loop of stack $15$ and winding $22a$ that are electrically symmetrical with respect to the heater voltage. This is readily achieved by connecting a lead $24$ to the transformer center tap $22b$ and connecting a lead $26$ to a point $28$ which is so located that the resistance between this point and the tap $22b$ is the same in both directions, i.e., by way of the ends $17$ and $18$.

With this circuit, the transformer secondary winding $22a$ and the stack $15$ form a four-arm bridge wherein substantially no heater voltage from the source $20$ appears between the center tap $22b$ and the point $28$. However, a net thermoelectric voltage from the junctions $14a$ and $14b$ does appear between these points, which are connected to data processing equipment, indicated at $30$, by leads $24$ and $26$. The alternating heater voltage can alternatively be separated from the thermoelectric stack voltage by connecting a low-pass filter (not shown) between the stack 15 and the data processing equipment indicated at 30.

In FIG. 1, the lead 26 has a portion 26a, below the point X coincident with the stack ends 15 and 17, and a portion 26b above the point X. Preferably, the portion 26a is of the same material as the conductors 10a and 10b, while the portion 26b is of the same material as the lead 24. With this arrangement, there is no net thermoelectric potential between the lead 24 and portion 26b due to connections to the stack 15 and transformer 22, since the junctions of the connections to the stacks (points 18, 17 and X) are at the same temperature, and are made to the same material within the stack.

Generally, the lead 24, portion 26b and transformer winding 22a will be of the same material, e.g., copper.

The stack 15 can alternatively be heated by a source of direct current, with a conventional bridge circuit providing isolation between the source and the output leads 24 and 26. However, it is preferable that alternating current be used to heat the stack 15 so that no net Peltier heating or cooling occurs at the thermoelectric junctions. Moreover, a small alternating potential appearing at the output terminals can more easily be separated from the direct thermoelectric potentials developed by the system.

Figure 2:
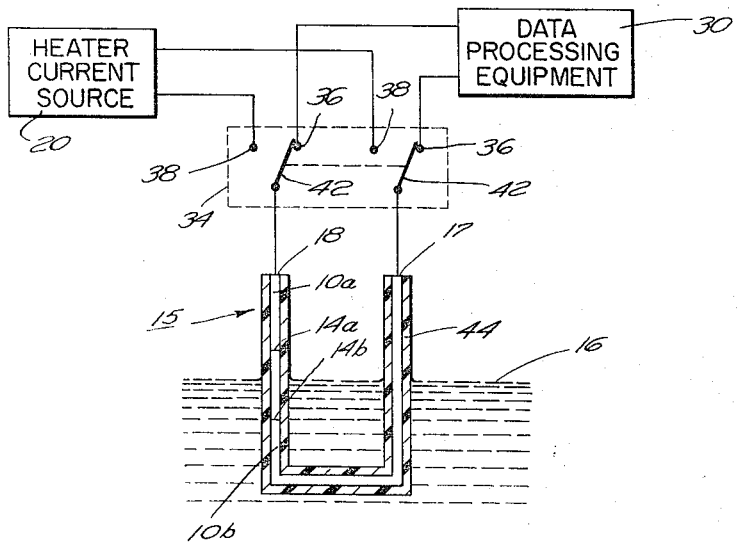
FIG. 2 is a simplified schematic representation of another embodiment of the invention.

FIG. 2 shows another circuit for directly heating the thermoelectric junction stack 15. Isolation between the source 20 and the output circuit is provided by a switch 34, which has a pair of terminals 36 connected to the data processing equipment 30 and another pair of terminals 38 connected to receive the heating current. The switch 34, in its simplest form, includes a pair of movable contacts 42 connected across the stack ends 17 and 18. The contacts 42 are operated by a conventional driving mechanism (not shown) to alternately connect the stack 15 to the source 20 and then to the data processing equipment 30.

As also shown in FIG. 2, the system may be adapted for use in an electrically conducting liquid, by disposing insulation 44 around the stack 15. The insulation electrically isolates the conductors 10a, 12 and 10b from the liquid, which otherwise would form a conducting path interfering with operation of the system. The insulation 44 is preferably of a material having a high heat conductivity, so as to ensure cooling of the immersed portions of the heated conductors by the liquid 10.

Figure 3:
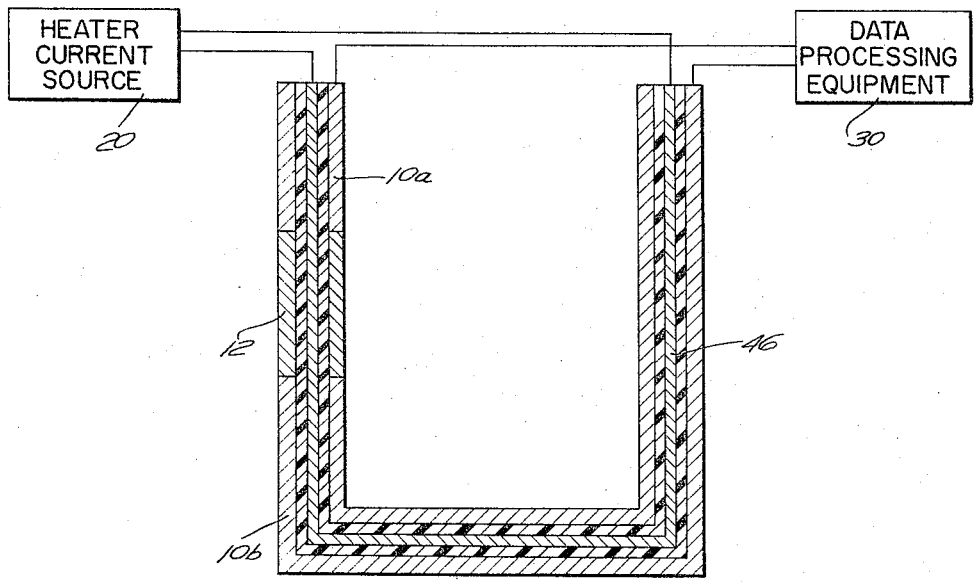
FIG. 3 is a simplified schematic representation of a level locating system utilizing indirectly heated thermocouple junctions.

In FIG. 3 we have illustrated a system in which the stack is indirectly heated. The conductors 10 and 12 are formed around a core 46, with an electrically insulating layer between the core and the conductors. The core 46, which is of suitable resistive material, is connected to the heating source 20, and current passing through the core generates the required heat. With this arrangement, the source 20 and output circuits are inherently isolated, and furthermore, direct heating current can be used without encountering the Peltier effect in the junctions 14a and 14b.

In FIG. 4 we have schematically illustrated a tank gaging system operating in accordance with the above principles and having an accuracy of four binary places. That is, it is capable of indicating 16 different liquid levels. The system includes thermoelectric stacks schematically indicated at 50, 52, 54 and 56, heated by current from the source 20 applied through the center tapped secondary 22a of the transformer 22. The thermoelectric output voltages of the stacks appear between terminals 50a–56a and the grounded center tap of the transformer. As in the foregoing embodiments of the invention, the stacks 50–56 are formed with alternating segments of two different materials, as indicated at A and B. For the sake of clarity, all of the conducting portions of one of those materials, including the A segments, are drawn with solid lines; the outlined conductors, including the B segments, are of the other material.

It is noted that both vertically extending conductors in each of the stacks 50–56 have the same segmented construction. This is for the purpose of maximizing the output voltages across the stacks. With this arrangement, the same thermoelectric voltages are developed across both conductors, and, thus, with the conductors connected together as shown, there is no tendency for current to flow from one of the two conductors to the other. On the other hand, in the stacks 15 of FIGS. 1–3, no thermoelectric voltage is developed across the unsegmented conductors. Accordingly, current circulates around the stack because of the net thermoelectric voltage developed in the segmented side thereof, and the resulting load imposed on the source of the net thermoelectric voltage diminishes this voltage.

In this connection, it is noted that the shunting resistances of many conductive fluids in which the system may be immersed are substantially greater than the resistances of the conductors in the thermoelectric stacks. Therefore, the system can be used in these fluids without electrical insulation on the immersed conductors.

FIG. 4 also includes a bias unit generally indicated at 58, whose inclusion in the system is desirable under certain conditions. In the embodiments of FIGS. 1–3, the output voltage of each stack of thermoelectric junctions alternates essentially between zero and a finite level. However, in some arrangements, the voltage may not change abruptly as the liquid level passes each thermoelectric junction. Rather, the output voltage may alternate between its two extremes in a roughly triangular waveform as a function of the depth of the liquid.

It will be apparent that the data processing equipment 30 includes a voltage quantizing circuit which indicates whether the voltage should be considered as having one extreme value or the other. That is, if the system is to provide a biary digital output, the voltage developed by each of the thermoelectric stacks must be quantized so as to indicate a biary ZERO when the voltage is on one side of a dividing line, or decision level, and a binary ONE when it is on the other side of the dividing line. Ideally, the dividing line is midway between the two voltage extremes, and in FIGS. 1–3, this means that it is midway between zero and the finite output voltage of the stacks 15. However, the latter level varies with the heating current passed through thermoelectric junctions, and, therefore, if the dividing line is set at a particular value of heating current, it is no longer correct if this current changes appreciably. In such case, the liquid levels corresponding to changes in the digital indication of the depth of the liquid may be shifted up or down, depending on the direction in which the current has changed.

This problem can be overcome by causing both voltage extremes to vary symmetrically about their midpoint as a function of temperature, and this is accomplished by the bias unit 58 of FIG. 4.

More specifically, the unit 58 includes a secondary 22c, on the transformer 22, connected to a half-wave rectifier and filter comprising a diode 59, resistor 60 and a pair of capacitors 61 and 62. A resistor 63 forms a voltage divider with the resistor 60.

Because of rectification and subsequent filtering of the incoming alternating current, there is a direct voltage across the resistor 63. This voltage is proportional to the voltage applied to the transformer 22 and thus it is also proportional to the heating voltage across the secondary 22a. The voltage across the resistor 63 is reduced a fixed amount by a zener diode 64 and the resulting voltage is reduced by voltage dividers 65a–65d, comprising resistors 66 and 67. The bias output appearing across the resistors 67, is taken from terminals 68a–68d. The bias voltages are in series with the thermoelectric voltages developed in the stacks 50–56 by virtue of the common ground connections; and thus the net output voltages of the stacks, i.e., thermoelectric voltages plus bias voltages, appear at the terminal pairs 50a–68a, 52a–68b, 54a–68c and 56a–68d. These terminal pairs are connected to quantizers 76.

The bias voltage, $V_B$, at each of the terminals 68a–68d is related to the input voltage $V_i$ of the transformer by $$V_B = k(cV_i - V_Z)$$

where, $V_Z$ is the voltage across the zener diode 64, and
$k$ and $c$ are constants.

The thermoelectric voltages developed in the stacks 50–56 vary according to the square of $V_i$, a relationship different from the one governing $V_B$. However, we have found that over a substantial range of variation of the input voltage, changes in the bias voltage closely correspond to changes in the thermoelectric voltages.

As an example of the parameters involved, one may assume that the input voltage at a primary of the transformer 22 has a nominal value sufficient to provide a 1 millivolt net thermoelectric voltage across each of the stacks 50–56. That is, the thermoelectric voltage developed by each stack alternates between 0 and 1 millivolt as the liquid level changes. The voltage across the resistor 63 may then be 19 volts, with a 10 volt drop across the zener diode 64. The potential across each of the dividers 65a–65d will then be 9 volts.

Assuming a value of 18000 ohms for each of the resistors 67 and one ohm for each of the resistors 66, the bias potential across each resistor 66 has a nominal value of 0.5 millivolt, i.e., one half the maximum net thermoelectric voltage.

Moreover, the bias potential of the unit 58 has the opposite polarity to that of the stacks 50–56. Assume that the stacks develop positive voltages and the unit 58 provides a negative bias voltage. Then, whenever the thermoelectric potential developed in a stack is 1 millivolt, the net voltage across a stack and the biasing unit in series therewith, i.e. between one of the terminals 50a–56a and one of the terminals 68a–68d is +0.5 millivolt. Whenever the voltage developed by the stack itself is zero, the net potential across each pair of terminals will be —0.5 millivolt. The decision level about which the output voltages of the stacks are quantized is zero potential with respect to the ground terminal.

Should the voltage of the source 20 vary within reasonable limits, the bias potential will change one half as much as the thermoelectric voltage. Therefore, the net voltage across a stack and the biasing unit in series therewith will still vary symmetrically about the zero volt decision level as the fluid depth changes.

The bias unit 58 can alternatively be constructed in the form of an additional thermocouple connected to offset the voltage produced by each stack by an amount equal to one half the algebraic sum of the zero and finite voltages developed by the stack. For example, a separate bias thermocouple can be connected in each stack in series with the sensing junctions. One junction of the bias thermocouple is immersed in the liquid or otherwise arranged to be at the temperature of the liquid. The other junction of the bias thermocouple is at the temperature of the heated, unimmersed sensing junctions. Moreover, the junctions of the bias thermocouple are made with materials that develop substantially one-half the non-zero, i.e. finite, level developed by the stack in which the bias thermocouple is connected. The voltage from the bias thermocouple is of opposite polarity to the finite voltage level of the stack. Such a bias thermocouple arrangement develops a bias voltage in each stack that algebraically adds to the stack voltage and produces the same result as the bias unit 58 shown in FIGURE 4.

This alternative biasing arrangement is illustrated in FIGURE 4A, wherein the source 20' is connected through transformer 22' to the four stacks, only one of which is shown, in the same manner as in FIGURE 4. However, a pair of thermoelectric junctions, each of which consists of the junction between conductive materials C and D, is in series in each path between the transformer winding 22a' and the stacks. One junction of each pair, shown proximate to the stacks, is continuously immersed. The other junction, shown proximate to the winding 22a', is at the temperature of the unimmersed stack junctions. The materials C and D are such that each pair of C–D junctions produces half the voltage of a pair of A–B junctions when corresponding junctions in the two pairs are at the same temperature, i.e. each immersed C–D junction develops a thermoelectric potential of one-half the magnitude of the thermoelectric potential of an immersed A–B junction, and likewise for the unimmersed C–D and A–B junctions.

It should be noted that preferably the stack 56 is inverted with respect to the stacks 50–54, in that its B section rather than its A section is connected to the conductors 70 and 71 conducting heating current to the stacks. The reason for this is that, if the B section were at the top of the stack, the junctions 56b would be at the top also and subject to cooling by the liquid should it reach the top of the tank. A study of the circuit will show that, in this situation, the system would indicate that the tank is empty when in reality it is full.

With further reference to FIG. 4, the stack 50 has eight thermoelectric junctions, and the output voltage from this stack, after quantizing, provides the right-hand digit of the Gray code representation of the level of the liquid 19. Specifically, when the level of the liquid is at one of the A segments, the output voltage of the stack corresponds to a ZERO and when it is at one of the B segments, the voltage corresponds to a ONE. This is set forth in the column of Gray code level representations shown at the right of tank 67 in FIG. 4.

Similarly, the output voltage of the stack 52 represents the second digit from the right in the Gray code representation of the liquid level; the output of the stack 54 represents the third digit from the right in the Gray code representation; and the output of the stack 56 represents the left-hand digit.

The terminals 50a–56a are connected to quantizers 76, which operate as described above to register ZERO's or ONE's corresponding to the output voltages of the individual stacks 50–56. By way of example, the quantizers may be Schmitt triggers, bistable circuits which are in one state when their input voltages are above the decision level and in a second state when the voltages are below this level. The quantizers thus supply to a Gray-to-binary and -analog converter 78 the digits of the Gray representation of the level of the liquid 19 within the tank 67. The converter 78 in turn converts the Gray number to a standard binary number and to an electrical analog representation of the depth of the liquid. The analog output is indicated by a meter 80.

It should be noted that the quantizer connected to the stack 56 provides an output opposite to that of those connected to the stacks 50–54. That is, with the inversion of the stack 56, the voltage level from this voltage stack corresponding to a ONE will correspond to a ZERO in the other stacks, and a voltage corresponding to a ZERO in the stack 56 will correspond to a ONE in the stacks 50–54.

Systems for converting a Gray number to a standard binary of an analog output are well known in the art. One such system is disclosed in the prior copending application of Sidney B. Williams, Serial No. 121,537, filed July 3, 1961 now Pat. 3,157,048 for "Digital Tank Gaging System." The copending application sets forth in detail the basic operation and advantages of a level sensing system constructed with a plurality of sensors disposed in a Gray coding arrangement. An important advantage, and one which is also provided by the present invention, is the fact that a minimum number of sensing units, e.g., thermoelectric junctions, are required to obtain the minimum ambiguity in the system. That is, the ambiguity occasioned by the decision of whether or not the level of the liquid is above or below a point corresponding to a decision level is no greater than the difference in height between successive junctions in the system.

Moreover, the system is free from moving parts and can be housed in a small space. Furthermore, it can readily be given a rugged construction to withstand shock and vibration.

As an example of the construction of the system, the A segments may be of constantan and the B segments of 80–20 Nichrome (i.e., approximately 80% Ni, 20% Cr), with the wire sizes in the stacks being about 5 mils for the constantan and 7 mils for the Nichrome so as to provide a substantially constant resistance per unit length. A heating current of 200 milliamperes will then provide a maximum thermoelectric potential across the stack of the order of one millivolt in the absence of a biasing voltage.

Figure 5:
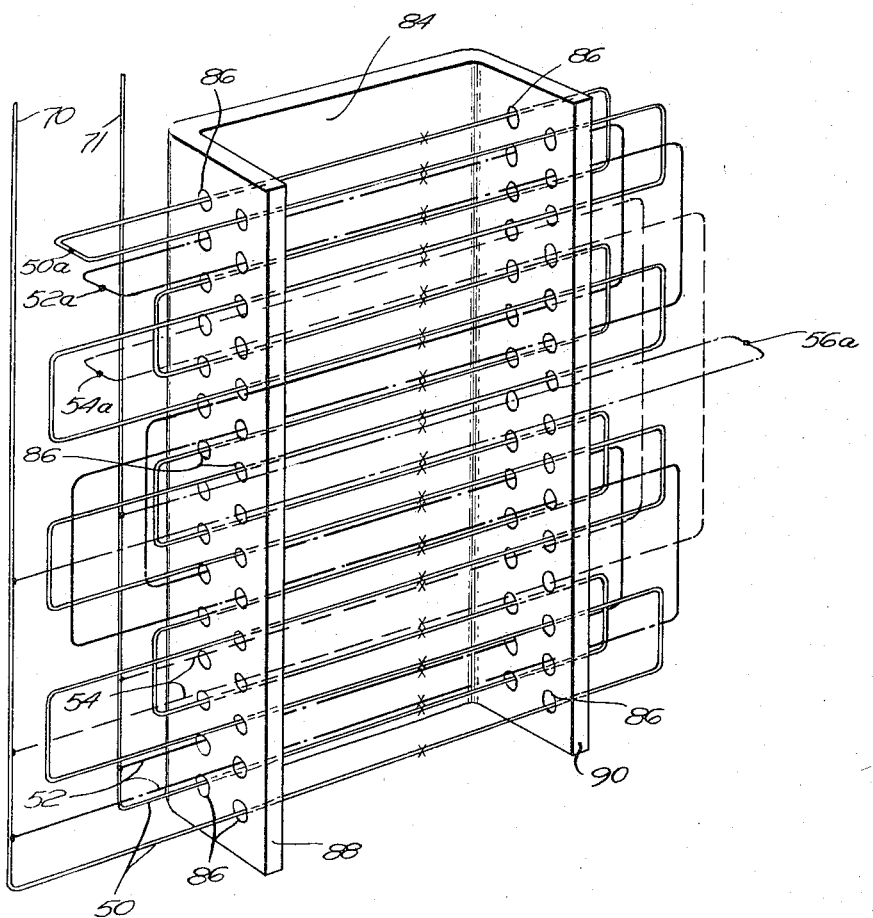
FIG. 5 is a perspective view illustration of a mounting arrangement for the thermoelectric sensors of FIG. 4.

FIG. 5 illustrates the preferred physical arrangement of the stacks 50–56 of FIG. 4. A channel member 84 is provided with opposing holes 86 extending through its flanges 88 and 90. The holes are arranged in two vertically extending columns in each of the flanges. The conductors in each of the stacks 50–56 run horizontally between oppositely disposed holes and vertically along the flanges 88 and 90 from one pair of holes to the next. The thermoelectric junctions between the "A" and "B" material which are located in the horizontal portions of the conductors, are indicated schematically at "X."

More specifically, the horizontal portions of the conductors are positioned in correspondence with the A–B junctions of FIG. 4. Thus, the two conductors of the stack 50 pass through the bottom set of four holes 86, i.e., the bottom two holes in each of the flanges 88 and 90. From these holes, they pass upwardly along the flanges 90 and then, through the third set of holes, across to the flange 88. In this manner they zig-zag back and forth between the two flanges, passing through every second set of holes 86.

The conductors of the stack 52 extend to the right (FIG. 5) through the second set of holes from the bottom and thence back and forth through each succeeding fourth set of holes 86. In the stack 54, the conductors extend between the flanges through the fourth and twelfth sets of holes. The conductors of the stack 56 pass through the eighth set of holes 86.

Preferably, the stacks 50–56 have the same electrical resistance, so as to draw the same heating current from the conductors 70 and 71. However, the total length of the horizontal portions of the stack 50 is twice that of the stack 52, four times the horizontal length of the stack 54, and eight times that of the stack 56. Accordingly, the vertical portions of the stacks 52–56 are provided with bights (not shown) which add the required lengths.

An important advantage of the construction of FIG. 5, in addition to its compactness, lies in the abrupt changes in the thermoelectric voltages as the liquid level rises or falls. Since the thermoelectric junctions are in horizontal portions of the conductors, a rise in the liquid level will cause a junction and the conductor portions immediately adjacent thereto to be immersed at the same time. Similarly, there is an abrupt change in voltage as the liquid level drops below the junction. This feature simplifies the task of detection of the discrete increments in the liquid depth measured by the system.

With further reference to FIG. 5, the four holes 86 in each set thereof need not be at the same level. Rather, the two outer holes, for example, may be slightly higher than the two inner holes. That is, one of the two wires in the stack passing through the four holes may be higher than the other wire. The voltage across the stack will then vary among three discrete levels instead of two.

For operation in the manner described above, the quantizers 76 (FIG. 4) may be arranged to register only the changes in stack voltages to the two extreme values thereof, in which case the resolution will be the same as in the construction shown in FIGS. 4 and 5. On the other hand, the quantizers may register all three voltage levels. This will increase the resolution of the system.

Figure 6:
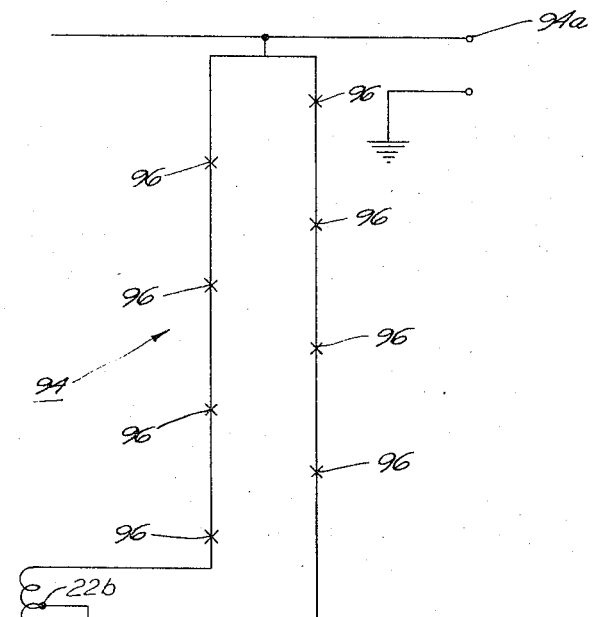
FIG. 6 is a schematic diagram of another embodiment of the invention using thermistors as the liquid sensors.

Another embodiment of the invention is shown in FIG. 6. A stack generally indicated at 94 comprises series-connected thermistors, indicated at 96—96. The thermistors on opposite sides of the stack are disposed at alternate levels as shown. They are heated by means of the transformer 22 in a bridge arrangement in the same manner as the thermoelectric junctions of FIG. 4. Similarly, the output voltage of the stack 94 appears between a terminal 94a and the grounded center tap 22b of the transformer secondary 22a.

When the liquid level is below all the thermistors 96, the latter are at the same temperature and their resistances are therefore equal. The voltages across the thermistors are thus the same, and the output voltage of the stack 94 is therefore zero. On the other hand, when the lowermost thermistor is immersed, it is cooled by the liquid and its resistance differs substantially from that of the other thermistors. The resistances of the two sides of the stack 94 thus differ, and with the different voltage drop across the immersed thermistor, an output voltage appears between the terminal 94a and ground.

If the liquid level rises to cover the next thermistor, the resistances on the two sides of the stack will again balance and the output voltage will return to zero. Thus, the voltage alternates between zero and a finite level as the liquid level rises and falls.

While only the stack 94 has been illustrated in FIG. 6, it will be apparent that a plurality of stacks may be used in an arrangement similar to that of FIG. 4. Specifically, stacks similar to the stack 94 may be substituted directly for the thermoelectric stacks 50–56 in FIG. 4, with each thermistor disposed at one of the levels detected by the system. The construction of FIG. 5, with the outer and inner holes 86 at different levels, may be used.

It will be understood that the invention can also be used to locate the interface between two liquids having different thermal diffusivities, particularly, when the thermoelectric junctions are heated. For example, liquid hydrocarbons such as gasoline are often stored over water, and the system described herein readily locates the interface between these two liquids.

As used herein, the term "vertical" means the direction in which the liquid level changes. The term "liquid" includes other fluids, such as fluidized solids.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

We claim:

1. A system for providing a multiple digit representation of the position of the surface of a liquid, said system comprising
   (A) a plurality of stacks of immersible thermoelectric junctions,
   (B) each stack extending through a range of liquid level to be measured by it,
   (C) at least a first stack having a first pair of terminal means and at least two junctions that can be immersed in said liquid and that are
(1) vertically spaced apart to be successively immersed by a rising liquid level,
(2) arranged in circuit between said first terminal means to develop a net thermoelectric voltage therebetween which changes back and forth between at least first and second values as the level of said liquid rises or descends past each immersible junction of said first stack,
(D) at least a second stack having a second pair of terminal means and at least two further junctions, at least one of which can be immersed in said liquid, and that are
(1) vertically spaced apart,
(2) arranged in circuit between said second terminal means to develop a net thermoelectric voltage therebetween which changes back and forth between at least two different values as the level of said liquid rises or descends past each immersible junction of said second stack, and
(E) output means responsive to the net thermoelectric voltages developed by the respective stacks.

2. The combination defined in claim 1 including means for maintaining said immersible junctions that are above said liquid at a temperature materially different from the temperature of the liquid.

3. The combination defined in claim 1 including means for heating said immersible junctions to maintain the junctions above the surface of said liquid at a temperature substantially greater than the temperature of said liquid.

4. The combination defined in claim 1 including
(A) first circuit means for passing through said junctions in said stacks electric currents of sufficient magnitude to heat the immersible thermoelectric junctions above the surface of said liquid to a temperature substantially greater than the temperature of said liquid, and
(B) second circuit means isolating the voltage of said current means from the net thermoelectric voltages developed by said stacks.

5. The combination defined in claim 1 in which said immersible junctions are substantially uniformly thermally exposed to said liquid when it immerses them.

6. Apparatus according to claim 1
(A) in which each of said junctions is formed by a pair of conjoined conductor portions, and
(B) further comprising support means supporting each of said immersible junctions with the conjoined conductor portions thereof being oriented substantially parallel to the level of said liquid.

7. A system for providing a multiple digit binary representation of the position of the surface of a liquid, said system comprising
(A) a plurality of stacks of immersible thermoelectric junctions,
(B) each stack extending through a range of liquid level to be measured by it,
(C) at least a first stack having a pair of terminal means and at least three junctions that can be immersed in said liquid and that are
(1) vertically spaced apart,
(2) arranged in circuit between said terminal means to develop a net thermoelectric voltage therebetween which changes between at least first and second values as the level of said liquid rises or descends past each immersible junction of said first stack,
(D) the junctions in each stack being disposed according to a binary coded representation of the position of the surface of said liquid so that each stack develops a net thermoelectric voltage identifying one digit of a multiple-digit binary signal corresponding to the position of said level, and
(E) output means
(1) responsive to the net thermoelectric voltages developed by the respective stacks, and
(2) producing a multiple-digit binary signal in which the digit in each digit position thereof is responsive to said voltage of one stack.

8. A system for providing a multiple digit binary representation of the position of the surface of a liquid, said system comprising
(A) a plurality of stacks of immersible thermoelectric junctions,
(B) each stack extending through a range of liquid level to be measured by it,
(C) at least a first stack having a pair of terminal means and at least three junctions that
(1) can be immersed in said liquid,
(2) are vertically spaced apart to be successively immersed by a rising liquid level,
(3) are arranged in circuit between said terminal means to develop a net thermoelectric voltage therebetween which changes between at least first and second values as the level of said liquid rises or descends past each immersible junction of said first stack,
(D) a bias unit developing a voltage of one-half the algebraic sum of said first and second values and with the opposite polarity thereto, and
(E) output means arranged to respond at least to the sum of the net thermoelectric voltage developed by said first stack and said voltage of said bias unit.

9. A system for providing a multiple digit binary representation of the position of the surface of a liquid, said system comprising
(A) a plurality of stacks of immersible thermoelectric junctions,
(B) each stack extending through a range of liquid level to be measured by it,
(C) at least a first stack having
(1) a pair of terminal means, and
(2) at least two junctions of a first type and one junction of a second type,
(a) said junctions of said first and second types producing, respectively, first and second electric potentials when at the same temperature,
(b) said junctions being
(i) immersible in said liquid, vertically spaced apart, and so disposed that junctions of said first and second types are immersed in alternate succession by a rising liquid level, and
(ii) substantially uniformly thermally exposed to the liquid when it immerses them, and
(iii) arranged in circuit between said terminal means to develop a net thermoelectric voltage therebetween which changes between at least first and second values as the level of said liquid rises or descends past each immersible junction of said first stack, and
(D) output means responsive to the net thermoelectric voltages developed by the respective stacks.

10. A system for providing a multiple digit binary representation of the position of the surface of a liquid, said system comprising
(A) a plurality of stacks of immersible thermoelectric junctions,
(B) each stack extending through a range of liquid level to be measured by it,
(C) at least a first stack having a pair of terminal means and at least three junctions that can be immersed in said liquid and that are (1) vertically spaced apart,
(2) arranged in circuit between said terminal means to develop a net thermoelectric voltage therebetween which changes between at least first and second values as the level of said liquid rises or descends past each immersible junction of said first stack,
(D) output means responsive to the net thermoelectric voltages developed by the respective stacks, and
(E) bias means in circuit with said first stack and producing such a voltage dependent on the temperature of said liquid that the algebraic sum of said net thermoelectric voltage of said first stack and said bias voltage alternates substantially equally about a selected voltage as the level of said liquid rises or descends.

11. A system for providing a multiple digit binary representation of the position of the surface of a liquid, said system comprising
(A) a plurality of stacks of immersible thermoelectric junctions,
(B) each stack extending through a range of liquid level to be measured by it,
(C) at least a first stack having a pair of terminal means and at least three junctions that can be immersed in said liquid and that are
  (1) vertically spaced apart,
  (2) arranged in circuit between said terminal means to develop a net thermoelectric voltage therebetween which changes between at least first and second values as the level of said liquid rises or descends past each immersible junction of said first stack,
(D) at least a second stack having a plurality of vertically spaced immersible junctions arranged to develop a net thermoelectric voltage that changes between at least third and fourth values as the level of said liquid rises or descends past each immersible junction,
(E) said immersible junctions in each stack being interconnected to provide at the ends of the stacks net signals which are the algebraic sums of the signals developed by the individual junctions in the stack,
(F) the junctions in the various stacks being disposed according to such a coded representation of the position of the surface of said liquid that successive sensors passed by the surface of said liquid as it rises and falls are in different stacks, and
(G) output means responsive to the net thermoelectric voltages developed by the respective stacks.

12. The combination defined in claim 11 in which said immersible junctions are disposed according to a Gray coded representation of the position of the surface of said liquid.

13. The combination defined in claim 11 in which said output means includes
(A) quantitizing means receiving said net thermoelectric voltages from each stack and producing binary signals in response thereto,
(B) binary-to-analog converting means receiving said binary signals and producing a corresponding analog signal, and
(C) analog readout means producing an analog indication of the position of the surface of the liquid in response to said analog signal.

14. Apparatus for locating the surface of a liquid, said apparatus comprising
(A) a first conductor extending through a range of liquid level to be measured,
(B) said conductor including at least three thermoelectric junctions
  (1) immersible in said liquid and substantially uniformly thermally exposed to said liquid when it immerses them, and
  (2) so arranged in series with each other and vertically spaced apart that junctions producing different thermoelectric potentials when at the same temperature are successively immersed when the level of said liquid rises, and
  (3) whereby the net thermoelectric voltage developed between the ends of said conductor by the immersible junctions alternates substantially between first and second values as the level of said liquid rises or descends past successive junctions.

15. Apparatus according to claim 14 in which
(A) each thermoelectric junction is formed by two conductor portions, and
(B) said conductor portions of each immersible junction are oriented substantially transverse to the direction of movement of the level of said liquid as the volume of said liquid changes.

16. Apparatus as defined in claim 14 further comprising
(A) a second heating conductor extending coaxial with said first conductor and electrically insulated therefrom, and
(B) a source of electric current connected to pass sufficient current through said second conductor to heat the immersible junctions of said first conductor above said surface to a temperature substantially above the temperature of said liquid.

17. Apparatus as defined in claim 14 further comprising
(A) an electrical source connected to pass a heating current through said conductor and thereby maintain the temperatures of the immersible junctions above said liquid at a temperature substantially above the temperature of said liquid,
(B) an electrical bias unit in series with said conductor, said bias unit providing a voltage whose value is intermediate said first and second voltages and of the opposite polarity to the algebraic sum of said first and second voltages, and
(C) binary output means in circuit with said first conductor and responsive to the sum of said net thermoelectric voltage and of said voltage of said bias unit.

18. Apparatus as defined in claim 14 including
(A) a bias unit developing a voltage of one-half the algebraic sum of said first and second voltages and with the opposite polarity thereto, and
(B) output means arranged to respond to the sum of said net thermoelectric voltage of said conductor and said voltage of said bias unit.

19. The combination defined in claim 18 in which
(A) said bias unit comprises a pair of thermoelectric bias junctions,
(B) one of said bias junctions being arranged to be at substantially the temperature of said immersible thermoelectric junctions in said conductor which are immersed in said liquid, and
(C) the other of said bias unit junctions being arranged to be at substantially the temperature of the immersible thermoelectric junctions of said conductor which are above the surface of said liquid.

20. The combination defined in claim 14 further comprising
(A) a heating means arranged to supply sufficient heat to said conductor to maintain the temperature of the immersible junctions above said surface substantially above the temperature of said liquid, and
(B) binary output means arranged in circuit with said first conductor and responsive to signals corresponding to said first and second values of said net thermoelectric voltage.

21. The combination defined in claim 20 in which said heating means includes
(A) an electric source connected to pass a heating current through said conductor and (B) means isolating the voltage of said source from said net thermoelectric voltage.

22. Apparatus as defined in claim 21 in which
(A) said isolating means comprises means forming a balanced bridge circuit,
(B) said first conductor is in one arm of said bridge circuit,
(C) said source is connected across one diagonal of said bridge circuit, and
(D) said output means is connected across the other diagonal of said bridge circuit.

23. Apparatus for providing a multiple digit binary representation of the position of the surface of a liquid, said apparatus comprising
(A) at least first and second conductors each of which
  (1) extends through a range of liquid level to be measured, and
  (2) includes a plurality of alternate segments of a first material and of a second material,
(B) a plurality of thermoelectric measuring junctions formed by the interconnections of said segments, said measuring junctions in each conductor being
  (1) immersible in said liquid,
  (2) substantially uniformly thermally exposed to said liquid when it immerses them, and
  (3) arranged to develop a net thermoelectric voltage that alternates between first and second different values as the level of said liquid rises or descends past successive measuring junctions in the conductor,
  (4) disposed according to a coded representation of the position of the surface of said liquid so that successive measuring junctions passed by the surface of said liquid as it rises and falls are in different conductors.

24. Apparatus as defined in claim 23 further comprising output means in circuit with each of said first and second conductors and developing a binary signal in response to said net voltage developed by each of said first and second conductors.

25. Apparatus as defined in claim 24 in which
(A) said measuring junctions are disposed according to a Gray coded representation of the position of the surface of said liquid with said second conductor having approximately one-half the number of measuring junctions as said first conductor, and
(B) said output means includes means converting the Gray coded binary signals from said conductors to an electrical analog signal corresponding to the position of the surface of said liquid.

26. Apparatus for locating the surface of a liquid, said apparatus comprising
(A) a plurality of thermal sensors producing electrical output signals that vary according to the temperatures of said sensors,
(B) said sensors being schematically arranged in at least a first pair of columns with the sensors in each pair of columns being further arranged in pairs comprising sensors successively immersed by said liquid as the surface rises,
(C) conducting means connecting together the adjacent ends of the columns in each pair thereof,
(D) means interconnecting said sensors in each column in such manner that in each pair of sensors, each sensor produces at the interconnected ends of the columns in each pair thereof a signal having opposite polarity to the signal produced by the other sensor in that pair, and
(E) means responsive to the net electrical output signals of said sensors developed between the opposite ends of the columns in each pair thereof.

27. The combination defined in claim 26 in which
(A) said sensors are thermally-sensitive resistors, and
(B) the sensors in each pair thereof are in different columns of the same pair thereof.

28. The combination defined in claim 26 further comprising means for passing through said columns a heating current of sufficient magnitude to heat the sensors immersed in said liquid to a substantially different temperature from that of the unimmersed sensors.

29. Apparatus as defined in claim 26 further comprising means forming a balanced bridge circuit having said first pair of columns in different bridge arms.

30. Apparatus for locating the surface of a liquid, said apparatus comprising
(A) a plurality of immersible thermoelectric junctions schematically arranged in at least a first pair of first and second vertically extending substantially coextensive circuit paths,
(B) conductor means connecting together the vertically adjacent ends of said first and second paths,
(C) said junctions
  (1) in each path being electrically in series with each other, and
  (2) being so arranged in said pair of paths that the net thermoelectric voltage developed between the vertically opposite ends of said paths by the immersible junctions therein alternates between substantially first and second values as the level of said liquid rises or descends, and
(D) binary output means in circuit with the vertically opposite ends of said pair of paths and arranged to respond to a binary signal having one of said first and second values.

31. Apparatus as defined in claim 30 in which
(A) said first and second paths have identical vertical distributions of said thermoelectric junctions so that at each level said paired paths have identical junctions, and
(B) successively immersed junctions in each of said first and second paths
  (1) developed different thermoelectric potentials when at the same temperature, and
  (2) are substantially uniformly thermally exposed to said liquid when it immerses them.

32. Apparatus for locating the surface of a liquid, said apparatus comprising
(A) first and second coextensive conductors extending through a range of liquid level to be measured,
(B) each of said conductors comprising
  (1) a plurality of segments of a first material alternated with
  (2) a plurality of segments of a second material,
  (3) immersible thermoelectric junctions formed by the interconnections of said segments at each level at which said liquid surface is to be located, said immersible junctions being substantially uniformly thermally exposed to said liquid when it immerses them and arranged to develop a net thermoelectric voltage that alternates substantially between first and second values as the level of said liquid rises or descends past successive levels,
(C) each conductor having at each level the same material as the other conductor,
(D) means forming a balanced bridge circuit,
(E) said conductors being arranged in arms of said bridge circuit in such a manner that a net thermoelectric voltage developed in one of said conductors appears across a first diagonal of said bridge circuit, and
(F) output means connected across said first diagonal of said bridge circuit.

33. Apparatus as defined in claim 32 further comprising
(A) a source of electric current connected across the other diagonal of said bridge circuit and arranged to pass through said conductors sufficient current to heat the immersible junctions thereof above the surface of said liquid to a temperature substantially above the temperature of said liquid, and (B) in which each of said conductors is associated with and in circuit with a bias unit developing a voltage whose magnitude is one-half the algebraic sum of said first and second voltages and whose polarity with respect to said output means is opposite to that of the algebraic sum of said first and second voltages.

References Cited by the Examiner

UNITED STATES PATENTS

| | | | |
|---|---|---|---|
| 2,279,043 | 4/1942 | Harrington | 73—295 |
| 2,702,476 | 2/1955 | De Boisblane | 73—295 |
| 3,111,031 | 11/1963 | Kurtiza | 73—304 |
| 3,157,048 | 11/1964 | Williams | 73—304 |

LOUIS R. PRINCE, *Primary Examiner.*

D. McGIEHAN, S. C. SWISHER, *Assistant Examiners.*